US010282125B2

(12) United States Patent
Korondi et al.

(10) Patent No.: US 10,282,125 B2
(45) Date of Patent: May 7, 2019

(54) DISTRIBUTED CONTENT DEDUPLICATION USING HASH-TREES WITH ADAPTIVE RESOURCE UTILIZATION IN DISTRIBUTED FILE SYSTEMS

(71) Applicant: International Business Machines Corporation, Armonk, NY (US)

(72) Inventors: Mark Korondi, Thalwil (CH); Dániel Kovács, Adliswil (CH); Michael C. Osborne, Richterswil (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 15/489,030

(22) Filed: Apr. 17, 2017

(65) Prior Publication Data

US 2018/0300078 A1    Oct. 18, 2018

(51) Int. Cl.
*G06F 3/06* (2006.01)
(52) U.S. Cl.
CPC .......... *G06F 3/0641* (2013.01); *G06F 3/0608* (2013.01); *G06F 3/0674* (2013.01)
(58) Field of Classification Search
CPC ............. G06F 3/0641; G06F 12/30949; G06F 12/30952
See application file for complete search history.

(56) References Cited

U.S. PATENT DOCUMENTS

| | | | |
|---|---|---|---|
| 8,190,835 B1 * | 5/2012 | Yueh ..................... | G06F 3/0608 711/159 |
| 8,402,250 B1 * | 3/2013 | Juillard ............. | G06F 17/30159 711/154 |
| 9,141,554 B1 * | 9/2015 | Candelaria .......... | G06F 12/0864 |
| 9,384,207 B2 | 7/2016 | Provenzano et al. | |
| 9,396,243 B1 | 7/2016 | Halevi et al. | |
| 9,841,909 B2 * | 12/2017 | Zhu ..................... | G06F 11/1451 |
| 9,977,918 B2 * | 5/2018 | Fan ..................... | G06F 21/6227 |
| 10,001,942 B1 * | 6/2018 | Sharma ................. | G06F 3/0641 |
| 2004/0133544 A1 * | 7/2004 | Kiessig ............. | G06F 17/30067 |
| 2006/0282457 A1 * | 12/2006 | Williams .......... | G06F 17/30159 |
| 2007/0014278 A1 * | 1/2007 | Ebbesen ................ | H04L 45/00 370/351 |
| 2008/0059420 A1 * | 3/2008 | Hsu .................... | G06F 17/30631 |
| 2009/0006853 A1 * | 1/2009 | Li ....................... | H04L 63/0428 713/176 |

(Continued)

OTHER PUBLICATIONS

Deepali Choudhari, et al., "Deduplication Techniques in Storage System," Int'l J. Adv. Research in Computer and Communication Engineering, vol. 4, Issue 11, Nov. 2015, pp. 399-402.

*Primary Examiner* — Midys Rojas
*Assistant Examiner* — Khoa D Doan
(74) *Attorney, Agent, or Firm* — Daniel P. Morris, Esq.; Hoffmann & Baron, LLP

(57) ABSTRACT

Systems and methods are provided for preserving data in a data deduplication system. A hash tree-based deduplication system balancing memory utilization and duplication-related storage access overhead is disclosed. The system preferably relies on distributed file system infrastructure and the system modifies this infrastructure. The data structures may be adapted to accommodate file-block distribution properties at runtime, such as runtime-specializing the hash tree to detect replicated chunks.

19 Claims, 1 Drawing Sheet

(56) References Cited

U.S. PATENT DOCUMENTS

| | | | |
|---|---|---|---|
| 2010/0070476 A1* | 3/2010 | O'Keefe | G06F 11/1453 707/640 |
| 2011/0231362 A1* | 9/2011 | Attarde | G06F 11/3442 707/609 |
| 2012/0106309 A1* | 5/2012 | Oishi | G06F 3/0608 369/53.44 |
| 2012/0166448 A1 | 6/2012 | Li et al. | |
| 2013/0268496 A1* | 10/2013 | Baldwin | G06F 17/30156 707/692 |
| 2014/0006858 A1* | 1/2014 | Helfman | G06F 11/1448 714/19 |
| 2014/0226413 A1* | 8/2014 | Gomez | G11C 16/3454 365/185.22 |
| 2014/0359043 A1* | 12/2014 | Gao | G06F 15/167 709/212 |
| 2015/0058301 A1 | 2/2015 | Kolodner et al. | |
| 2015/0278030 A1* | 10/2015 | Zhu | G06F 11/2097 707/623 |
| 2016/0103858 A1* | 4/2016 | Katz | G06F 17/30949 707/797 |
| 2016/0110377 A1* | 4/2016 | Yun | G06F 17/30174 713/165 |
| 2016/0162508 A1* | 6/2016 | Brosch | G06F 17/30156 707/692 |
| 2016/0224588 A1* | 8/2016 | Harijono | G06F 17/30156 |
| 2017/0364301 A1* | 12/2017 | Rudelic | G06F 12/023 |

\* cited by examiner

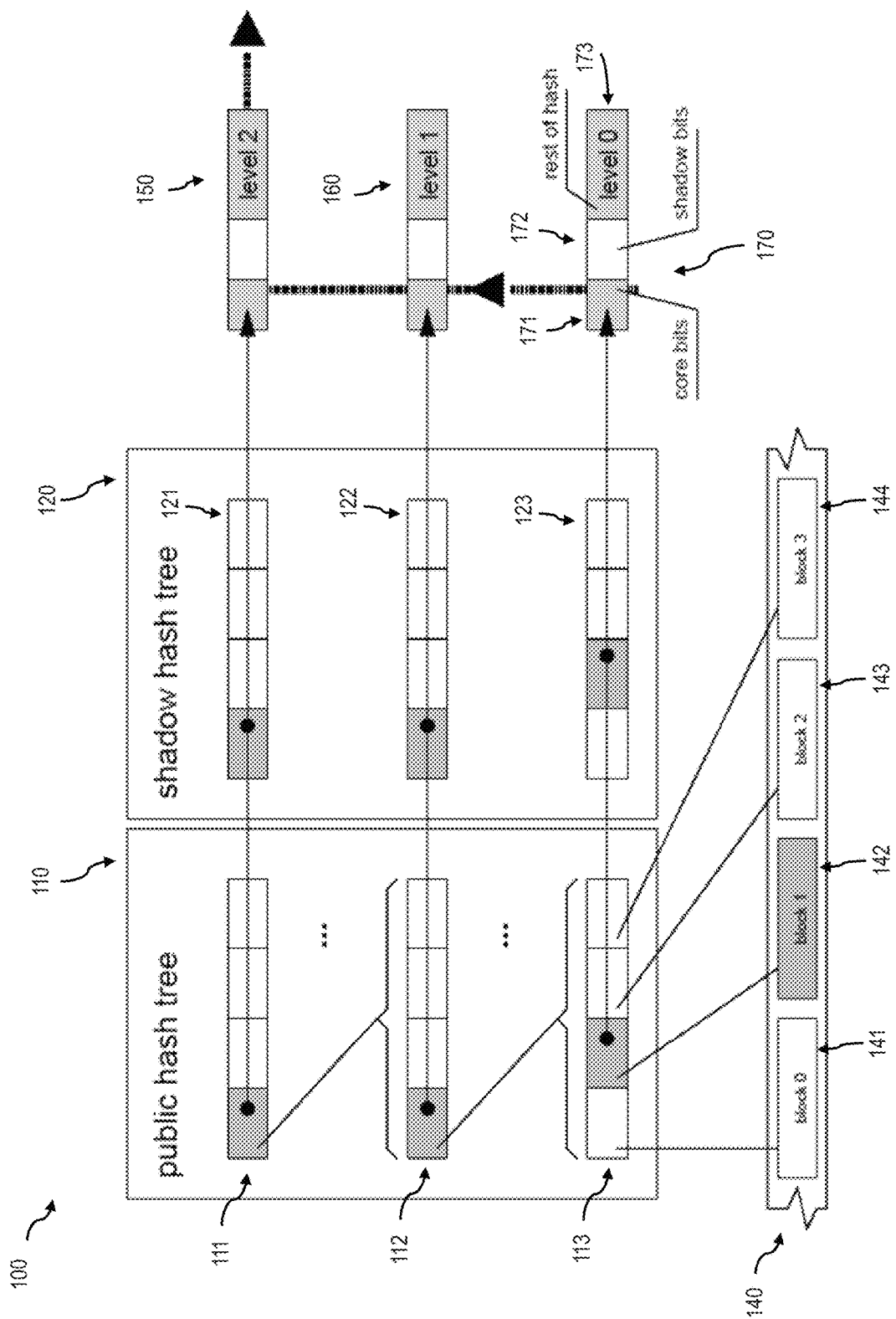

DISTRIBUTED CONTENT DEDUPLICATION USING HASH-TREES WITH ADAPTIVE RESOURCE UTILIZATION IN DISTRIBUTED FILE SYSTEMS

BACKGROUND

The present invention relates to the technical field of file deduplication. More specifically, the present invention relates to the use of hash-trees with adaptive resource utilization for deduplication.

Typically, it is desirable for multiple different clients, which may be completely unaware of each other, to store data on the same storage system. This allows the entity providing the storage system to more efficiently utilize storage space, often by removing duplicate content. This reduction in overall storage usage by detecting replicated content, or deduplication, is an optimization technique employed by file systems.

Hashes are a compact representation storing shorter checksums to describe much larger data in a compact fashion. Even if hashes provide only negative proofs—different hashes mean different inputs—hash-based comparisons can be used to quickly identify potentially identical input blocks. With sufficiently large hash output, chances of hash collisions are sufficiently low as to shorten the list of potentially matching candidates considerably, even if subsequent bytewise comparison is needed for absolute certainty. Hash trees extend hashing to structures with $O(\log N)$ hierarchical levels of hashes for N input blocks, allowing updates in sub-linear speed.

Hash-based comparisons are frequently used for large systems to provide fast equality comparisons, and many deduplication methods utilize hash trees to detect identical blocks locally, within the same storage node. However, due to conflicting requirements of high-performance, dynamic hash data structures and cross-network transparency, file system wide global deduplication based on hash trees is not used by distributed file systems (DFSes). Some state-of-the-art file systems use only block-by-block comparison, not arranging hashes into hash trees. Note that btrfs (B-tree file system) hash-storage implementation problems are concentrated around efficient storage of hashes within existing linear metadata, which basically prohibits organizing hashes into hash trees. None of the distributed file systems searches for replicated blocks in a global hash tree of all DFS content.

Since DFSes may vary in both in static and dynamic size, one may not simply scale up hash trees from local nodes. In addition to raw sizes, a DFS may elect to change resource usage radically at runtime, such as increasing memory usage during recovery. An efficient hash-based, DFS-wide deduplication system must be able to adapt to such dynamic changes within reasonable limits. Therefore, hash-assisted deduplication may need to prioritize adaptivity over raw efficiency.

Practical limitations on DFS sizes imply that even very short truncated hashes—starting at 32 bits—radically reduce hash collision probabilities. Increasing hash sizes essentially increases hash tree storage linearly: storage of the lowest-level hashes dominates total size, with higher hash levels contributing little (even if superlinear, but with a low constant). At the same time, increasing hash sizes reduces the chance of hash collisions exponentially. Therefore maximizing hash sizes for comparisons is of paramount importance. These two contradictory design goals need to be balanced.

For an order-of-magnitude comparison, individually numbering all atoms in the Solar System would require approximately 192 bit indexes. The largest known comparable single-image DFS as of this writing, at CERN, contains approximately $2^{32}$ disk blocks. Under these conditions, a minimum hash size of 32 bits would be a reasonable lower bound, and allowing at least 128 bits as an upper limit would allow the system to scale to any foreseen DFS, with a negligible chance of hash collisions, even after truncation.

While there is considerable hash-assisted deduplication work in some state-of-the-art file systems, many of these attempts are limited to local storage, and do not scale to DFSes. As a general theme, most approaches inheriting local-system limitations fail to scale to DFSes without major inherent scalability limits. At a lower level, deduplication which only works for data within predefined limits is entirely unsuitable with DFSes, which are by nature dynamic and volatile.

Even in some file systems which integrate multiple storage devices in one system, block-by-block comparisons are used, without arranging hashes into hash trees. This is usually a design limitation, when hashes are tied to disk blocks, which makes it inconvenient to reorganize them in memory-resident hash structures. When deduplication is restricted to statically sized, worst-case data structures, the fixed constraint may prohibit deployment, even if results could be obtained through use of smaller data structures. Tolerating the cost of additional checks has been shown to work with inexact data structures in large distributed systems.

As such, a distributed content deduplication system using hash-trees with adaptive resource utilization is needed.

SUMMARY

The present invention relates to a hash tree-based deduplication system and method for DFSes, balancing memory utilization and duplication-related storage access overhead. The system, in embodiments, relies on infrastructure required by state-of-the-art DFSes, and the system may be implemented as a modification to this infrastructure. The data structures may be adapted to accommodate file-block distribution properties at runtime, such as runtime-specializing the hash tree to detect replicated "chunks:" multi-disk-block units of data, typically used by DFSes to amortize network overhead.

In embodiments, a system based on a hash tree distributed among the nodes of a DFS is provided. The system may switch hash sizes without major design impact. The system removes replicated data from a distributed file system through techniques derived from cryptographic hash functions and defines data structures and infrastructure which may be deployed adaptively, and reconfigured even at runtime, balancing deduplication overhead versus dynamic resource usage. Unlike specialized structures, the system may adaptively balance its hash-collision rates versus memory usage.

Unlike systems based on highly specialized but inflexible data structures, the system, in an aspect, intentionally uses simple structures which may be tracked by remote DFS nodes and tolerates relatively higher probabilities of superfluous disk reads. The simple structures may be easily resized/rebalanced, trading off storage accesses against higher memory usage, matching local resource availability without informing other nodes. By setting a low common denominator, nodes are allowed to optimize their time/storage tradeoffs, while still participating in the same globally visible hash tree.

The system, in embodiments, may be adapted to dynamic resource utilization, allowing incremental adaptation as the underlying DFS undergoes size changes. The same dynamic controls may or enters stages of high resource utilization, such as when rebalancing content after major device disruption.

In embodiments, the invention performs various operations, including building a hash-tree, a scalable data structure which can describe & reliably detect replicated data, suitable for inline disk usage, using a hash-change-broadcast mechanism, reusing typical distributed-file system infrastructure, to broadcast hashes of blocks changed as storage nodes receive new data, and finding and marking blocks duplicated beyond RAS (reliability/resiliency etc.)-derived minimum replication target: merge unintended replicated instances.

In embodiments, the data structures may be partitioned to balance resource usage and reduction in traffic in a fully dynamic manner. The system may further be bootstrapped, deployed into an existing file system, without major service impact.

In an embodiment, a system for deduplication comprises a disk unit comprising a deduplication infrastructure and comprising a first core hash tree and a first shadow hash tree and configured to receive a changed disk-block unit, calculate an updated hash based on the changed disk-block unit, updating a changed disk-block unit's hash in the core hash tree and the shadow hash tree using the updated hash, and broadcast the updated hash. In a preferred embodiment, updating a changed disk-block unit's hash in the core hash tree comprises replacing the previous hash of the changed disk-block unit in the first core hash tree with the updated hash, calculating an updated second level hash of the updated hash, and replacing a previous second level hash in the first core hash tree with the updated second level hash.

In an optional embodiment, the system comprises a listener, where the listener comprises a second core hash tree and a second shadow hash tree and is configured to receive the updated hash from the disk unit and compare the updated hash to the hashes in the core hash tree. In a further optional embodiment, the listener is further configured to compare the updated hash to the hashes in the shadow hash tree if the comparison of the updated hash to the hashes in the core hash tree determines that the hashes match. In an optional embodiment, the system further comprises a broadcast-sender queue operatively connected to the disk unit and the listener. In a preferred embodiment, the queue is associated with a hash tree. In a permissive embodiment, the disk unit is configured dynamically change the number of shadow bits. In a further permissive embodiment, the first core hash tree comprises a set of truncated hashes. In optional embodiments, the first core hash tree comprises block hashes, the first core hash tree is associated with a locally attached disk, and/or the elements of the first core hash tree comprise the most significant bits of hashes. In a preferred embodiment, the system further comprises a resolver that performs peer-to-peer verification of matching content. In an advantageous embodiment, the disk unit is configured to perform a rebalancing operation of the first shadow hash tree and where the rebalancing operation comprises a discarding of shadow bits.

In embodiments, a method for deduplication comprises calculating a first hash tree based on a multiple of disk-block units, calculating a second hash tree and storing a set of shadow bits in the second hash tree, receiving a changed disk-block unit, updating the changed disk-block unit's hash in the first hash tree and the second hash tree, broadcasting a list of updated hashes to a listener, where the list of updated hashes comprises full hashes, and comparing, by the listener, the full hashes. In an optional embodiment, comparing produces an at least one newly encountered hash. In another optional embodiment the method further comprises connecting, by the listener, to a source of the changed disk-block unit. In further optional embodiments, the method also comprises receiving, by the listener, the disk-block unit and comparing a set of shadow bits.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWING

So that the manner in which the above-recited features of the present invention can be understood in detail, a more particular description of the invention, briefly summarized above, may be had by reference to embodiments, some of which are illustrated in the appended drawing. It is to be noted, however, that the appended drawing illustrates only typical embodiments of this invention and the invention may admit to other equally effective embodiments.

FIG. 1 illustrates a procedure for detecting modification with an adaptable chance of hash collisions, according to an embodiment of the present invention.

Other features of the present embodiments will be apparent from the Detailed Description that follows.

DETAILED DESCRIPTION

In the following detailed description of the preferred embodiments, reference is made to the accompanying drawing, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

In embodiments, hashes are assumed to be truncated, not fully stored in persistent form. Using cryptographic hash functions, which must be "pseudorandom functions" (PRFs)

in the cryptographic sense, arbitrary subsets of bits may be selected with assumed-ideal distribution from the full hash. The system, in embodiments, implicitly assumes that comparable, hierarchically partitionable checksums of sufficient size are available, which disqualifies some practically used disk-checksum algorithms. Practically, the method may assume a PRF with at least 64, preferably 128 or more, bits of output. Longer hash output may be used but may provide only diminishing returns for practical DFSes as of the date of this disclosure. Future DFSes may have different performance characteristics that benefit from longer hash output.

System Overview

Assuming access to a hash function with sufficiently many bits, the system in an embodiment uses the minimum number of bits to form the hash tree, calculates and compares considerably longer hashes when checking for collisions, and allows hash trees to store more bits than the minimum even persistently. These parameters allow the system to balance benefits with per-node resource usage. The accepted-minimum number of bits maintained in the hash tree ("core bits") allows even nodes of modest resources to maintain their view of total system state, i.e., hash trees of all other nodes. Since deduplication assumes that all nodes may maintain their copy of core-bit-based hash trees, it sets a lower limit on deduplication efficiency, applicable even under memory-stress scenarios.

If the node has sufficient memory to maintain more than just the core bits, it may store some bits beyond the core ones ("shadow bits"). Since shadow bits are obtained from truncating the same base hashes, their maintenance only adds to memory requirements but are otherwise just a by-product of regular hash tree updates. Note that cryptographic hash functions are "pseudorandom functions," with assumed-independent distribution of output bits, as a design goal. Therefore, core and shadow bits should be assumed to be both ideally distributed, and hash-collision probabilities drop considerably with each additional available bit.

When comparing the effect of updates, only a modest number of blocks changes in steady state, since this is limited by disk/network bandwidth, and the number of blocks actually changing. Therefore, the number of hashes which must be maintained in memory during comparisons is limited, and these transient hashes may store even 512-bit hashes if so desired.

Embodiments of hash tree-based deduplication methods for distributed file systems (DFSes) are described below that assume that the DFS already provides the following infrastructure primitives on its nodes. 1. The system assumes available broadcast channels, allowing direct node-to-node communications. 2. The system assumes partitioner support, distributing all file system operations across "chunks," each considerably larger than individual disk blocks. Chunks are the units of replication for the DFS. 3. The system assumes "sufficient" memory on each node to maintain a (preferably large) hash tree, hashing all node-visible disk blocks. Presently, generating multi-megabyte data structures per terabyte of raw disk—cf. state-of-the-art recommendation for 1:1000 memory:disk ratio for ceph is expected. Note that there is a marked difference in steady-state versus exceptional RAM: disk ratios. The system may adapt to dynamic changes in DFS RAM usage. 4. The system assumes notification infrastructure such as asynchronous interrupts notifying node-resident monitors of file-content changes. Such notifications are typically natively provided by operating systems, but are mentioned here for completeness.

Given the above infrastructure components, the following is added for deduplication. 1. A hash tree, containing truncated hashes, storing hashes of disk-level blocks, or their small multiples, at its lowest level is added. Block hashes are aggregated in a hierarchical structure of O(log N) levels for N blocks. Size of the lowest level of the hash tree is O(N) with a small constant—the ratio of disk-block size versus hash output size. A separate hash tree for each locally attached disk is maintained. 2. A specification of hash-tree construction is added, documenting how many of the most significant "core" bits of a hash are to be considered by hash-tree construction. 3. Notification software that monitors disk changes and propagates them upwards in hash trees is added. 4. A broadcast-sender queue is added with one queue per hash tree and sending hashes which changed recently to other recipients. 5. A Broadcast-recipient is added. This listener monitors change-broadcasts from other nodes (disks). 6. A resolver that performs peer-to-peer verification of matching content is added. Any subsequent deduplication steps would follow resolution.

As an important contribution, the sizes of locally stored and broadcast hashes are allowed to diverge. Longer hashes for each change are calculated and broadcasted, but only a truncated version within the actual hash tree is included. Increasing hash sizes decreases the chance of collisions, but increases hash-tree memory usage proportionally (under realistic conditions, the lowest level of hash trees will dominate all RAM usage, see below). Any additional bits of hashes used, following the "core" (most significant) bits are referred to as "shadow bits."

According to an embodiment, the system detects modifications with adaptable chance of hash collisions using the above primitives as shown in the procedure 100 of FIG. 1. The system stores the hashes in a public hash tree 110 and a shadow hash tree 120. At each level of the public hash tree 110, the hashes of the levels below are hashed to propagate the changes up the tree. For example, the set of disk blocks 140, e.g. block0 141, block1 142, block2 143, and block3 144, are hashed into the tree element 113, which is then hashed into tree element 112, which is in turn hashed into tree element 111. If a change occurs in block1 142, the change will propagate up to element 113, element 112, and element 111. Similarly for the shadow hash tree 120, a change in tree element 123, will propagate up to tree element 122 and tree element 121.

1. Calculate a hash tree, starting with (a small multiple of) disk-block units. Calculate full hashes; store the most significant core bits in a hash tree. This collection is referred to as the "public hash tree" 110. Calculate hashes of disk-block unit hashes, then hashes of those hashes etc., until a single hash tree is formed. The hash tree 110 is built using only "core" bits of hashes.

2. Store shadow bits in a separate shadow hash tree 120. This shadow hash tree 120 will mimic the structure of the public tree, inheriting the size from shadow—as opposed to core—hash bit count.

3. For each changed disk-block, update its hash in both the public hash tree 110 and the shadow hash tree 120. As with other hash calculations, temporarily store full hashes of any changed unit. Since the number of updates will be considered small. Compared to the size of the entire hash tree, even resource-constrained nodes are expected to be able to manage full lists of changed blocks' hashes; the latter list is transient.

4. Broadcast the list of freshly updated hashes, using full hashes in the broadcast. Note that updates will remain considerably smaller than disk-block updates. Therefore the difference between broadcasting core and full hash bits is considered negligible.

5. Listeners receive broadcasts of full hashes. Listeners are other software and/or hardware devices in the system or connected to the system. They may be computing elements or disk units. A computer network can connect the listeners to the unit originating the broadcasts main operations. They can compare core bits immediately. Any shadow bits may be used to further reduce the cost of hash collisions.

6. Listeners who detect at least one of the newly encountered hashes contact the originator directly. Typically, a secondary hash calculation establishes whether the content may be really identical. A subsequent direct comparison is used only if hashes are shown to be identical.

As a straightforward secondary-hash verification step, one may calculate a hash using the same inputs with a different initial hash state (such as appending the same, fixed data to both units, and re-calculating their hashes). Comparing a secondary hash first allows the system to rely on full-hash collision probabilities—higher than the probability of only core+shadow bits matching. As a side effect, on nodes with local caches, reading the unit for the secondary hash calculation will cause it to be cached for the subsequent full-unit byte-by-byte comparison.

7. When two nodes have established that they share disk units, they may broadcast this information for any DFS-wide listener. Subsequent DFS-visible deduplication steps, such as rerouting requests to duplicated data to their original copy, may be performed.

The asymmetry between stored and broadcast hashes' sizes allows the system to adapt to heterogeneous environments.

1. Nodes with overprovisioned RAM may maintain hash trees with wider hashes than what is included in the tree. Such nodes may compare more bits per hash than what is included in the tree, therefore, they may reduce the chance of collisions below the probability maintained by the hash tree. In an example, a node may store 64 bits per hash, while including only the most significant 32 in calculations. This decreases hash-collision probabilities by a factor of $10^9$ as 32 additional bits must match.

2. Nodes with minimal RAM store only the minimal, 32-bit hashes.

3. Nodes with fast storage, especially for small, read-only requests, typical with solid-state disks (SSDs)—may elect to discard parts of their hash tree, or store hashes below 32 bits for certain parts. When changed, additional disk reads would be needed to reconstruct the expected-minimum hash tree, but if RAM is at a premium, such tradeoffs may be temporarily feasible. As an example scenario, during reconstruction after failure, RAM requirements would increase, but only temporarily.

Since the system is based on hashes, it requires additional hash-collision resolution before confirming the presence of duplicated content. While hash collisions for state-of-the-art cryptographic hash functions are considered to be infeasible to encounter, it must still compare chunks/blocks for identical contents. Even if hashes are identical, one must not discount the almost negligible chance of hash collisions for data safety. Comparing entries across a DFS-global hash tree, the system must accommodate the number of hash-tracked disk blocks/chunks to grow as a function of total disk capacity. Memory constraints force the system to truncate hashes. Therefore, the hash trees store only a small subset of hash bits. An embodiment of this truncation is shown in FIG. 1. At each level, the hash contains core bits, shadows bits, and the rest of the hash 173. At level 0, the hash 170, has core bits 171 and shadow bits 172. Likewise, the level 1 hash 160 and the level 2 hash 150 will have bits split between core bits, shadow bits, and the remaining part of the hash. Because of the truncation and especially when compared across a large DFS, hash collisions of truncated values are inevitable.

The system differentiating between broadcast and actually stored hashes allows diverging node states, depending on per-node resources, while maintaining a consistent global state. Nodes are allowed to store more information about hashes than they reveal, allowing a distributed network to use potentially inexact information and locally refine it.

While this approximate use of hashes differs from that of Bloom filters, since searching is limited for matching hashes in width, but never search less of hash trees, the system may be assumed to be similarly successfully applied in a distributed scenario.

Bootstrap Procedure

Reading state-of-the-art hard drives requires at least tens of hours even at maximum data rates as of this disclosure for some configurations. A low-priority background deduplicator is expected to require considerably more. Since the system would require at least an initial read of each drive during its initial bootstrap, optimizing the bootstrapping procedure for simplicity instead of performance is recommended.

Recognizing that DFSes tolerate transient inconsistencies by construction, the system may be adapted to bootstrap more efficiently than a naive implementation. The bootstrapping process may be simplified by separating participants into the majority of nodes building hash trees ("workers"), and a minority of them aggregating hash-tree information ("collectors").

The bootstrap flow optimized for this setup passes through the following stages:

1. Enumerate the number of nodes/disks visible in the DFS. Assign a small set of nodes to collect hash trees, possibly set up to form a "shared" hash table between them (i.e., allow collectors to load-balance). Worker/collector assignment must balance collector memory usage against the worker/collector ratio. One must maximize the number of workers, since the global bottleneck is disk-reading latency at this stage. The number of collectors should be selected to allow sufficient total memory for the initial aggregated hash tree; using oversized core+shadow bit counts accelerates worker startup later.

2. Workers scan their attached drives, building the per-drive hash trees, as a low-priority background task. Hash trees are sent to collectors, who gradually aggregate partial worker results, building up the system-wide hash tree Worker-to-worker communication is not needed during this stage; notifications only need to be passed from workers to collectors.

3. When the aggregated hash tree approaches completion, collectors send broadcast notifications. If workers have sufficient local storage for transient bootstrap-acceleration use, such transient structures be allocated when this notification is received.

4. When the aggregated hash tree is assumed complete, collectors build lists of potentially identical hashes. These candidates for deduplication are sent only to affected workers. In addition to notifying node groups of potentially identical content, collectors broadcast the entire hash tree. Workers complete their local hash trees with the aggregate.

5. Workers resolve any collisions with other workers in a node-to-node fashion. At this point, workers no longer need to rely on collectors' hash trees: local copies are available.

6. While workers resolve collisions, collectors switch to local collection, adding their own drive contents to the workers' aggregated hash tree. During this stage, (previous) collectors may passively listen to notifications from (previous) workers, but their primary goal is adding their own drives' statistics to the aggregated hash tree.

7. As collectors complete the processing of their local drives, they broadcast their updates, and enter their steady state. At this point, all nodes have built their hash trees, and only node-to-node notifications are needed.

Once all hash trees have been initialized, the system would fall back to its steady state. The above simplified bootstrap procedure may be preferable to simultaneous, uniform startup for the following reasons. Workers' communication patterns are simpler with dedicated collectors: workers may be even added during the initial collection stage. Relying on collectors aggregating the full hash tree, workers need not listen for broadcasts during the initial collection, and workers may be fully dedicated to local processing. When the number of workers is maximized, many nodes build their own hash trees as soon as possible (i.e., only collectors need to delay their own drive scans). Instead of all workers processing the full hash tree, only collectors need to build the first set of possibly-identical blocks. This list of matching hashes could be naturally built as a side effect when aggregating worker notifications (i.e., mark newly noticed duplicates when merging newly arriving worker data). Instead of workers contacting every other one for possible hash matches, collectors simply notify pairs of nodes with blocks to compare—an expected $O(N^2)$ communication overhead with a very small constant since only node-to-node, potentially matching blocks' lists need to be sent to each participating node pair.

Note that the above bootstrap procedure assumes that node resources are approximately balanced. If the DFS includes nodes with disproportionately oversized RAM or fast local storage, such as SSDs, an alternate configuration may depend on such separate nodes maintaining the hash tree even in steady state.

Extensions

The system may be clearly partitioned into a read-only instance, and interception capabilities needed to actively deduplicate a DFS. In a read-only instance, "passive deduplication" is possible by offline detection of identical content, supplying administrative hints when replicated content is encountered. Since offline deduplication lacks the latency constraints of its online ("active") counterpart, a passive instance may offer further options. As an example, when aware of fast, bulk writes, the passively managed hash tree may elect to queue changes, and process the entire queue when notified of bulk writes terminating.

While the method is primarily applicable to file systems without encryption, a generalized form applies directly to encryption schemes based on convergent encryption. In such cases, where data-dependent keys encrypt identical plaintexts to identical ciphertexts, the method would continue to detect such replicated content.

An alternate distribution of collision-identification may depend on dedicated nodes maintaining the hash tree, and storage nodes supplying only notifications. While unreasonable for DFSes with homogenous node-disk/memory configurations, the hash tree may be maintained by dedicated nodes with oversized memory (or comparably fast random-access storage, such as SSDs).

With dedicated hash-comparing nodes, nodes need to collect only their incremental updates, and rely on external hash comparisons. Other than locating potentially identical blocks through these dedicated nodes, the process is essentially identical to the base scenario.

Hardware/Software Aspects

As shown, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX® (a registered trademark of The Open Group), and Windows® (a registered trademark of Microsoft Corporation), are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A system for deduplication, comprising:
at least one disk unit comprising a deduplication infrastructure, a first core hash tree and a first shadow hash tree, the disk unit being configured: to receive a changed disk-block unit, to calculate an updated hash based on the changed disk-block unit, to update a changed disk-block unit's hash in the core hash tree and the shadow hash tree using the updated hash, and to broadcast the updated hash, wherein the disk unit is configured to dynamically change a number of shadow bits.

2. The system of claim 1, wherein updating a changed disk-block unit's hash in the core hash tree by the disk unit comprises:
replacing a previous hash of the changed disk-block unit in the first core hash tree with the updated hash;
calculating an updated second level hash of the updated hash; and
replacing a previous second level hash in the first core hash tree with the updated second level hash.

3. The system of claim 1, further comprising a listener, wherein the listener comprises a second core hash tree and a second shadow hash tree, the listener being configured to receive the updated hash from the disk unit and to compare the updated hash to the hashes in the second core hash tree.

4. The system of claim 3, wherein the listener is further configured to compare the updated hash to the hashes in the second shadow hash tree if the comparison of the updated hash to the hashes in the second core hash tree determines that the hashes match.

5. The system of claim 3, further comprising a broadcast-sender queue operatively connected to the disk unit and the listener.

6. The system of claim 5, wherein the broadcast-sender queue is associated with a hash tree.

7. The system of claim 1, wherein the first core hash tree comprises a set of truncated hashes.

8. The system of claim 1, wherein the first core hash tree comprises block hashes.

9. The system of claim 1, wherein the first core hash tree is associated with a locally attached disk.

10. The system of claim 1, wherein elements of the first core hash tree comprise most significant bits of hashes.

11. The system of claim 1, further comprising a resolver that performs peer-to-peer verification of matching content.

12. The system of claim 1, wherein the disk unit is configured to perform a rebalancing operation of the first shadow hash tree, and wherein the rebalancing operation comprises a discarding of shadow bits.

13. A method for deduplication, comprising:
calculating a first hash tree based on a multiple of disk-block units;
calculating a second hash tree and storing a set of shadow bits in the second hash tree;
receiving a changed disk-block unit;
updating the changed disk-block unit's hash in the first hash tree and the second hash tree;
broadcasting a list of updated hashes to a listener, wherein the list of updated hashes comprises full hashes; and
comparing, by the listener, the full hashes.

14. The method of claim 13, wherein comparing produces an at least one newly encountered hash.

15. The method of claim 14, further comprising connecting, by the listener, to a source of the changed disk-block unit.

16. The method of claim 15, further comprising receiving, by the listener, the disk-block unit.

17. The method of claim 13, wherein comparing the full hashes comprises comparing a set of core bits.

18. The method of claim 13, wherein comparing the full hashes comprises comparing a set of shadow bits.

19. A system for deduplication, comprising:
at least one disk unit comprising a deduplication infrastructure and comprising a first core hash tree and a first shadow hash tree, the disk unit being configured to receive a changed disk-block unit, to calculate an updated hash based on the changed disk-block unit, to update a changed disk-block unit's hash in the first core hash tree and the first shadow hash tree using the updated hash, and to broadcast the updated hash; and
a listener comprising a second core hash tree and a second shadow hash tree, the listener being configured to receive the updated hash from the disk unit and to compare the updated hash to the hashes in the second core hash tree.

* * * * *